United States Patent
Salter et al.

(10) Patent No.: US 12,218,932 B2
(45) Date of Patent: Feb. 4, 2025

(54) FACIAL RECOGNITION TOKENIZATION

(71) Applicant: ROYAL BANK OF CANADA, Toronto (CA)

(72) Inventors: Margaret Inez Salter, Orlando, FL (US); Iustina-Miruna Vintila, Bucharest (RO); Arya Pourtabatabaie, Orlando, FL (US); Edison U. Ortiz, Orlando, FL (US); Sara Zafar Jafarzadeh, Kitchener (CA); Sayedmasoud Hashemi Amroabadi, Toronto (CA); Christopher Côté Srinivasa, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 56 days.

(21) Appl. No.: 17/382,255

(22) Filed: Jul. 21, 2021

(65) Prior Publication Data

US 2022/0029987 A1    Jan. 27, 2022

Related U.S. Application Data

(60) Provisional application No. 63/110,214, filed on Nov. 5, 2020, provisional application No. 63/054,630, filed on Jul. 21, 2020.

(51) Int. Cl.
*H04L 9/40* (2022.01)
*H04L 9/32* (2006.01)

(52) U.S. Cl.
CPC ........ *H04L 63/0861* (2013.01); *H04L 9/3218* (2013.01); *H04L 9/3271* (2013.01); *H04L 63/0435* (2013.01)

(58) Field of Classification Search
CPC ............... H04L 9/3231; H04L 63/0435; H04L 63/0861; H04L 9/3218; H04L 9/3271; H04L 2209/50
See application file for complete search history.

(56) References Cited

U.S. PATENT DOCUMENTS

| | | |
|---|---|---|
| 5,276,735 A | 1/1994 | Boebert et al. |
| 2003/0063780 A1 | 4/2003 | Gutta et al. |

(Continued)

FOREIGN PATENT DOCUMENTS

| | | |
|---|---|---|
| WO | 2017070858 A1 | 5/2017 |
| WO | 2018222211 A1 | 12/2018 |
| WO | 2020072882 A1 | 4/2020 |

OTHER PUBLICATIONS

World Intellectual Property Organization (WIPO), International Search Report and Written Opinion issued to PCT/CA2021/051014, Oct. 26, 2021.

(Continued)

*Primary Examiner* — Jason K Gee
*Assistant Examiner* — Brian William Avery
(74) *Attorney, Agent, or Firm* — Norton Rose Fulbright Canada LLP

(57) ABSTRACT

An approach for increasing security of biometric templates is described. An improved system is adapted to split a full set of features or representations of a trained model into a first partial template and a second partial template, the second partial template being stored on a secure enclave accessible only through zero-knowledge proof based interfaces. During verification using the template, a new full set of features is received for comparison, and a model is loaded based on the available portions of the model. Comparison utilizing the second partial template requires the computation of zero-knowledge proofs as direct access to the underlying second partial template is prohibited by the secure enclave.

18 Claims, 11 Drawing Sheets

(56) References Cited

U.S. PATENT DOCUMENTS

| | | |
|---|---|---|
| 2003/0088782 A1 | 5/2003 | Forrest |
| 2007/0079081 A1 | 4/2007 | Gladwin et al. |
| 2008/0273766 A1* | 11/2008 | Kim .................... G06V 40/173 |
| | | 382/118 |
| 2009/0034805 A1* | 2/2009 | Perlmutter ........... G06V 40/171 |
| | | 382/118 |
| 2010/0194530 A1 | 8/2010 | Davida |
| 2011/0135166 A1 | 6/2011 | Wechsler et al. |
| 2011/0296440 A1 | 12/2011 | Laurich et al. |
| 2012/0204035 A1 | 8/2012 | Camenisch et al. |
| 2013/0174243 A1 | 7/2013 | Natomi et al. |
| 2014/0157384 A1 | 6/2014 | Stern et al. |
| 2015/0078630 A1 | 3/2015 | Derakhshani et al. |
| 2016/0086078 A1 | 3/2016 | Ji et al. |
| 2016/0132720 A1* | 5/2016 | Klare .................... G06V 10/50 |
| | | 382/118 |
| 2017/0054716 A1 | 2/2017 | Egorov et al. |
| 2018/0137382 A1* | 5/2018 | Nowak ............... H04L 67/1097 |
| 2019/0278937 A1 | 9/2019 | Streit |
| 2020/0092102 A1 | 3/2020 | Wang |
| 2020/0228339 A1* | 7/2020 | Barham ................ H04L 9/0869 |
| 2020/0228341 A1 | 7/2020 | Mohassel et al. |
| 2020/0259638 A1* | 8/2020 | Carmignani ............. H04L 9/50 |
| 2021/0232667 A1* | 7/2021 | van Vredendaal ...... G06F 7/582 |
| 2022/0385653 A1* | 12/2022 | Scholz ................ H04L 63/0861 |

OTHER PUBLICATIONS

European Search Opinion issued in connection with European Application No. 21845632 dated Dec. 4, 2023.

\* cited by examiner

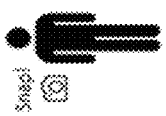

500 x: photo of face.
GC: Garbled circuit that on weights $w'$ as input, evaluates to 1 iff $w'(x) = 1$, i.e. the NN with $w$ as its weight accepts $x$, along with a circuit to verify if the input $w'$ being used is committed to by $C_w$.

Present U-Prove token, commit to weights $w$ as $C_w$

Committing oblivious transfer 1

$x$
OT2

OT3, GC $C$

OT - Open All

If GC correct, open C
Accompanying algebraic proof for $w = w'$

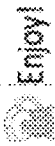 Enjoy!

Verification - Expanded

Compute GC output $Z'$
$C := Commit(Z')$

FIG. 5

FACIAL RECOGNITION TOKENIZATION

CROSS-REFERENCE

This application is a non-provisional of, and claims all benefit, including priority to, US Application Nos. 63/054,630 dated Jul. 21, 2020, and 63/110,214, dated Nov. 5, 2020, both entitled: FACIAL RECOGNITION TOKENIZATION, incorporated herein by reference in their entireties.

FIELD

Embodiments of the present disclosure relate to the field of biometric identity validation, and more specifically, embodiments relate to devices, systems and methods for identity recognition having improved computational privacy.

INTRODUCTION

Biometric systems, especially those for facial recognition, can be used for identifying or validating an individual through a comparison of various representations of features extracted from a data source, such as an image, a video, etc. Facial recognition systems, in particular, pose a significant privacy threat as they store images of facial features, the face, or the model itself, which can all provide knowledge of the individual as, for example, models still encode within their internal data structures, the original data of the customer who provided the information (e.g., face data) to authenticate himself or herself.

Privacy considerations are important when providing recognition systems using biometrics, as it is undesirable to store information in an unaltered form for use in identification or verification which can then be used to re-generate or re-create part or all of the underlying features for future usage.

While facial recognition is particularly useful in situations where validation using physical objects such as a driver's license, passport, social insurance card, etc., are no longer practical (e.g., in a pandemic situation to avoid the inadvertent spreading of disease), it is important to establish computational safeguards around the potential mis-use of stored templates and features.

SUMMARY

Biometric systems, such as face recognition, fingerprinting are prone to malicious attacks and growing privacy concerns regarding the user's personal data. Current face recognition systems present a privacy threat to the end customer if they store the images or videos containing customer data. There is need for technical solutions adapted for ensuring that personal information is secure and not made available to public access. Using biometric recognition (e.g., a face recognition system) as a mechanism for touchless customer operations is an important consideration, especially in a global pandemic situation, to minimize interactions between customers and employees. Due to privacy considerations, it may be desirable to ensure that after a model or a profile is created (e.g., in accordance with an initial issuance protocol establishing the reference model as a data representation), the original data (e.g., photo data) are not stored.

The system can be configured to avoid specific types of potential privacy breaches (e.g., possible abuses of the system) by the different parties. A number of different technical approaches are proposed herein for modifying how credentials are generated, stored, or used during verification processes to reduce risks to privacy.

For example, the identity issuer (e.g., a trusted financial institution) might desire to track a user's (Alice) behavior and build a profile in violation of Alice's privacy. This can be prevented, as described in some embodiments herein, by storing signed credentials on Alice's local device and not requiring the financial institution's computing systems to be accessed or accessible (e.g., online) at verification time.

At the initial credential issuance time, the identity issuer (in this case a financial institution, but it does not necessarily need to be a financial institution in all examples) computing system could take multiple photos of Alice's face and train a model. However, the financial institution's computing system does not need to store the photos or the model after the issuance protocol has concluded.

Similarly, the identity verifier, in this example, Bob the bartender, might desire to learn more about his customers than he has reason to know, including but not limited to biometric information. Zero-knowledge proofs (ZKP) are presented herein to mitigate this potential issue. A number of variations are described that can be useful in different situations, such as in scenarios where the credential verifying/issuance devices have limited computing power to conduct a large number of cryptographic functions.

Finally, the identity owner, Alice may desire to share her credentials with her friend Carol. In order to do this, Alice could try and bind her credential to a photo of an object she and Carol both have access to, say, a pen. To counter this, the system is specially adapted to ensure sure that she is actually taking photos of her face and not a pen at issuance time.

That can be done by either human intervention on at a financial institution or trusted party, if the issuance is happening in-person, or by automatically matching Alice's selfies against a government-issued ID, such as a driver's license. Note that this still requires the selfies to be sent over to the trusted identity issuer. Even with this protection, Carol could at verification time, simply use a stored photo of Alice's face to fraudulently prove ownership of Alice's credential. For this reason, Bob could need to capture Alice's photo himself on his device, for example, to ensure authenticity and liveness of the photo Alice is using as witness to her proof. This "live" (temporally proximate to verification) photo can then serve as a common input as part of a biometric verification process that is then utilized by both Bob and Alice's devices.

As described in some embodiments herein, an approach for zero-knowledge proofs can utilize neural networks, such as binary neural network (BNN), adapted to support proof techniques based on symmetric cryptography, such as garbled circuits. A garbled circuit is a cryptographic approach that is used for joint evaluation of a function using inputs by parties that do not necessarily trust one another, and the garbled circuit, for example can use various randomized permutations for the "garbling".

The garbled circuit can be established by the verifying device (e.g., Bob's device) based on the commitment object.

The garbled circuit can then be solved by Alice's device using a combination of the weights of the model and the common input, and Alice's device can also transfer an algebraic proof in respect of the evaluation of the garbled circuit. If the response messages from Alice are acceptable, Bob's device could generate an output indicating that Alice's attributes are acceptable. This can, in a simple example, be a display on Bob's device indicating that Alice is of age to purchase an age-restricted item, for example, or in another embodiment, an automatically transmitted control signal actuating the dispensing of an age-restricted item or service (e.g., such allowing access through an automatic turnstile).

In an alternative approach can include the usage of anonymous credential signature approaches (such as U-Prove) that are are algebraic constructs. After a U-Prove presentation proof, Alice and Bob can agree on a Pedersen commitment to the function, and in some embodiments, this algebraic commitment is converted into a non-algebraic one for interoperability.

In accordance with the methodology of Chase, Ganesh and Mohassel, they will perform one of the following to ensure that Alice is using the values committed to by her Anonymous Credential as input to the Garbled Circuit:

Alice will either break up her input vector into bits, commit to each individual bit, and prove in zero knowledge that it is a correct bit decomposition of her input vector. After the Oblivious Transfer subprotocol, Alice sends commitments to each input key $K_i$ to Bob. After in accordance with the methodology of Jawurek et al, Bob reveals the randomness he used in the Oblivious Transfer subprotocol, Alice proves in zero knowledge for each bit $w_i$ of her input that $K_i = x(K_i^1 - +K_i^0) + K_i^0$.

Bob will randomize values a, b and adds a garbled subcircuit that computes t:=af+b. After evaluating the circuit, Alice sends a commitment to the value t to Bob. When opening the circuit, Bob also reveals his auxiliary input a, b whereupon Alice proves in zero knowledge that the relation t=af+b holds.

A technical challenge with biometric systems is the varying level of available computational resources for conducting biometric determinations within a constrained period of time. There is a trade-off between competing technical objectives as every required increase in accuracy, robustness, and security has corresponding impacts on computing performance.

A privacy-enhanced computational approach is described in some embodiments below, describing a system, corresponding methods and non-transitory computer readable media adapted for improving privacy preservation through the adaptation of zero-knowledge proof protocols.

It is important to note that computational resources are finite (especially for embodiments where the approach is being implemented on a mobile device or a portable reader, such as a point-of-sale kiosk or transaction processing device), especially where the terminals and endpoints storing or using biometric-based tokens are portable or low-cost terminals or endpoints. The approach provides a technical solution to technical problems relating to privacy preservation, as well as establishing a technical trade-off in relation to maintaining satisfactory performance and reducing model leakage that can be utilized by malicious users. Privacy can be enhanced at various points of the on-boarding, usage, and storage computational processes relating to biometric recognition (e.g., facial recognition, fingerprint recognition, voice recognition).

In a first approach, the computational system, during registration of the features of a corpus of individuals (e.g., a few hundred or a few thousand individuals), a subset of the universe of features is identified having characteristics that are more pertinent to biometric (e.g., facial) recognition than others. These characteristics can be identified, for example, through determining the subset of features which exhibit the largest amount of variation as between the corpus of individuals and/or are most useful in distinguishing between individuals. In some embodiments, the varying characteristics are determined during a pre-training stage where a large corpus of reference feature sets relating to a training set of individuals is utilized. In a variant embodiment, the varying characteristics are dynamically determined on a periodic or triggered basis whereby the subset of features selected is modified over time. This is useful where, for example, the quality of images changes in a systematic way, such as where individuals start to provide feature sets where most individuals are now wearing face masks (e.g., in view of a recent pandemic), and the system can automatically adjust for these to ensure privacy enhancements shift focus from lips (e.g., no longer visible) to corners of eye features (still visible), among others.

The first partial feature or partial model portion set data object can be utilized in combination with the remaining subset of the full biometric feature set or representations of the model to complete the model during a verification using the completed model. Segregated storage (e.g., with the remaining subset stored on more secure storage) allows for enhanced security whereby the system is adapted to prevent the release of the entire array of floating point numbers yet are still able to enable the authentication flow as requested during a verification step.

In some embodiments, the ZKP model feature representations can be used alone to conduct the verification. If sufficient computing resources are available, in some embodiments, all features of the model are stored as ZKP model features. In a variant embodiment, a confidence score may be assessed from the ZKP model feature representations, and if the confidence score is not sufficiently high, the verification may further include augmenting the ZKP model with features from the partial feature or partial model portion set data object. The confidence score may be generated based on an accuracy level associated with the prediction response when the model or partial model is utilized, the prediction response indicating, for example, whether if a new face image during verification belongs to the same user from the trained model or partial model.

For example, in the context of facial recognition tokens where images, depth map representations, and/or videos are processed from each of the individuals, backgrounds may not be of particular pertinence, but there may be aspects of the faces themselves represented in a specific subset of features that vary and are useful for facial recognition/identification/differentiation. An example feature set can include a face model that is a large vector of real point numbers (for example, represented as floating point numbers), and the approach can include picking 15 of those floating point numbers that vary the most (e.g., to obtain 10 bits of variation). Those 15 numbers are designated as special and they are stored in secure enclaves having special characteristics for enhanced protection, while the other features can be stored in less secure repositories. Enhanced protection can include secure enclaves that are adapted to limit interactions such that the underlying data cannot be interacted with directly (rather, the data can only be interacted with through zero-knowledge proof based protocols or interfaces).

There can be different approaches for identifying this subset, for example, a machine learning model, such as a neural network can be utilized to rank or categorize the features which provide the largest logit difference during classification training. The ranked features can then be utilized to extract an identified subset of features from the universe of available features. The neural network can be configured to identify features and/or nodes representing features of interest by, for example, systematically or randomly de-activating nodes of various hidden layer representations during classification to test for differences in accuracy (e.g., as exhibited through logit differences). The neural network can be stored on encrypted storage or other extremely high security mechanisms given the sensitivity of the information stored and processed thereon. In some embodiments, multiple different machine learning model data architectures are utilized together to be trained on a number of input data sets (e.g., faces, videos), and the different layers and nodes are deactivated to identify how an accuracy score evolves or de-evolves over time or as a proportion of the layers or nodes are deactivated.

In a second approach, the computational system is configured to utilize a targeted cryptographic mechanism applied to only part of the feature set or part of a model trained based on the biometric data (e.g., images) of the person during enrollment. The targeted cryptographic mechanism can be computationally expensive to generate and/or decrypt for future processing, and restricting the usage of the cryptographic mechanism to only part of the feature set reduces the overall computational burden. The targeted cryptographic mechanism, in some embodiments can be adapted to improve privacy of the feature or model portion representation, and in some embodiments, a "zero-knowledge proof" mechanism can be adapted for usage on a segregated partial feature set or partial model. The partial feature set or model portion for enhanced privacy-preserving encryption can be randomly selected or a pre-defined proportion of the full feature set or full model, or in some embodiments, can be identified using the first approach as an input into the computational mechanism when receiving or onboarding a new individual.

When the new individual's full feature set is received during the on-boarding, the computational system is configured to split a representation of the full feature set into a first partial feature set and a second, secured partial feature set. Where a model is being split, similarly, a full model can be split into a first partial model and a second partial model. The combination of the first partial model and the second partial model may, for example, represent an entire token or credential, which may, in some cases, also be signed or otherwise attested to using an encryption key (e.g., private key) of a trusted issuance authority (e.g., a bank—the signature can be compared against a publicly available public key of the bank that is exposed on the bank's APIs or website).

The first partial feature set or partial model portion set stores a first subset of features or model portions, and the second partial feature or partial model portion set stores a second subset of features or model portions where the second subset of features or portions have been transformed in accordance with an enhanced privacy-preserving encryption approach described herein. The first partial feature or partial model portion set is stored separate to the second partial feature or partial model portion set, and the second partial feature or partial model portion set is stored in a higher security data repository that is adapted for limited interactivity after information is loaded thereon.

The full feature set can be discarded or simply not stored by the computational system for future usage (e.g., as a template), and instead, the hybrid feature set or the trained model in the first and second partial feature or partial model portion sets are stored separately for future usage. The second partial feature or partial model portion set, in some embodiments, contains the more sensitive information (e.g., more sensitive features or model portions). As privacy-preserving encryption has been applied to the second partial feature or partial model portion set, it may be more difficult or computationally impractical for a malicious user to be able to reverse engineer the full feature set from it, or without it.

The data repository storing the first partial feature or partial model portion set as a partial template for future usage can be of lower security (and thus less expensive) than that for storing the machine learning data model architecture of the first approach described herein, and the usage of the privacy-preserving encryption is useful in reducing an overall risk and impact of a malicious user being able to use the information even if unauthorized access has occurred. In some embodiments, instead of having a lower security data repository, the first partial feature set or partial model portion is simply not stored either.

The second partial feature or partial model portion set is utilized during a verification step, and is maintained on a segregated data repository whereby during presentation, when a new feature set is adduced for identity attestation, the second partial feature or partial model portion set cannot be utilized directly. Rather, the verification steps is adapted to utilize a zero-knowledge proof mechanism whereby limited interactions are capable with the second partial feature or partial model portion set.

In a verification interaction, the first partial feature or partial model portion set can be used directly. However, as the second partial feature or partial model portion set cannot be interacted with directly, it is instead is utilized to generate proofs against the corresponding features of the new feature set. A set of determinations are conducted in correspondence with a zero knowledge proof, whereby relative calculations are possible without either side of the verification exposing the underlying feature information. In another embodiment, the first partial feature or partial model portion set is used as additional features to enhance an accuracy level or a confidence level of a determination using the second partial feature or partial model portion set.

In an example, the zero knowledge proof can involve a distance function, where, for example, the approach includes taking a biometric vector (e.g., face vector) for establishing a Euclidean distance or another type of distance. In this example, there can be a hypothetical reserved 15 digits corresponding to a special portion of the new feature set for attestation can used for subtraction and squared them up, and then subtraction can be conducted using the other 15 digits corresponding to the second partial feature or partial model portion set of the template. In this example, neither side sees the original numbers but they see the results of the subtraction—neither side sees the 15 digits (e.g., corresponding to various bits) of the other.

In some embodiments, the system can be provided in the form of a physical computer server that resides within a data center having interconnections with upstream and/or downstream computing devices. For example, in the context of a financial institution, the system can be utilized as a gatekeeper authentication mechanism for various types of sensitive interactions requiring validation, such as usage of a mobile application related to online banking, registration at a bank teller counter, among others.

Upstream systems can request, through an application programming interface (API) call a request for facial recognition on-boarding and/or subsequent matching, and a computation process can be invoked to conduct this process, whereby a facial recognition token is generated in the on-boarding process for future usage as a template for verification. When the privacy-preserving hybrid data structure is generated and stored as a template, it can be stored and propagated across multiple data repositories for usage in verification, such as being loaded on on-board memory of the individual's personal device, on an on-board memory of a bank teller authentication terminal. The first portion can be stored on less secure repositories, while the second portion can be loaded into a secure repository, such as a secure enclave.

Instead of, or in addition to requesting other authentication, such as providing a client card and a PIN, the facial recognition mechanism can then authenticate against the privacy-preserving token. As only the first partial data structure is stored, for example, on less secure non-transitory computer readable media, even if the first partial data structure data structure is exposed (e.g., by a malicious user using a man in the middle attack), because the privacy-preserving encryption was applied to the second partial set of features, the exposed elements of the data structure are not useful for reverse engineering the full feature set.

There are various practical uses and implementation variations possible. For example, the proof system can store the templates on a user's mobile device, and can be used for attestations to indicate various characteristics of the individual are true to satisfy various types of threshold verifications (e.g., this face is over 21 for access at a bar). The partial feature sets and data structures thereof can be represented as tokens in a personal information bank, which can then be used to securely represent various biometrics (e.g., voice, retina, fingerprints, other types of images—add as variations). The use of zero-knowledge proofs across the second partial feature or partial model portion set enhances privacy at the cost of computational complexity, and from a practical perspective, it is conducted on a subset as one cannot afford the computational resources to utilize this mechanism on the whole model. The special treatment of the second partial feature or partial model portion set enhances security such that it is difficult for a malicious user to be able to access and/or export a full feature set from compromised data.

Corresponding methods, systems, and computer readable media are contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 5 is an example expanded verification computer implemented method, according to some embodiments.

In FIG. 10, instead of cross-entropies as shown in FIG. 9, one class loss is utilized instead.

DETAILED DESCRIPTION

Figure 1:
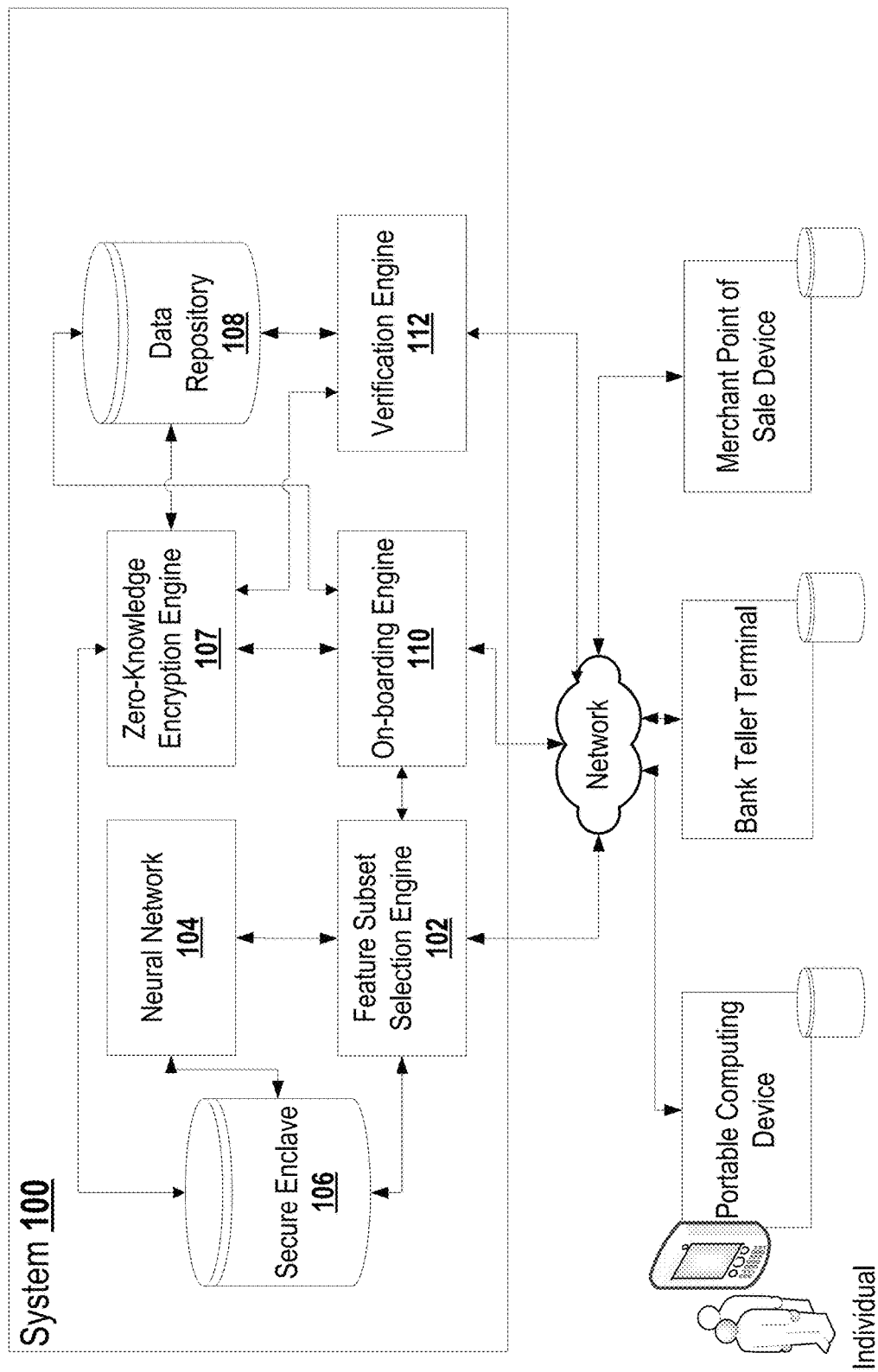
FIG. 1 is a computational system adapted for applying enhanced privacy mechanisms for biometric feature-based authentication, according to some embodiments.

From a security perspective, systems are proposed herein using biometric data sets that require enhanced security measures (e.g., where a third party service provider (such as cloud provider or a bank) might not host on their premises a customers' complete biometric dataset). This includes, for example, the output of a facial recognition model in the form of an array of floating point numbers. However, there may be a need, for example, to utilize the customer's biometric data to securely provide payments capability without compromising privacy.

A privacy-enhanced computational approach is described in some embodiments below, describing a system, corresponding methods, and non-transitory computer readable media adapted for improving privacy preservation through the adaptation of zero-knowledge proof protocols.

The approach can, for example, be a solution to the credential lending problem. Consider an example scenario where Alice owns a verifiable credential encapsulated as a data object, issued by a financial institution, asserting that she is 21 years old, and that she can use the credential (e.g., by transmitting it for verification by a computing device) to prove in zero knowledge to Bob, a liquor store owner, that she can legally purchase certain products requiring age verification. In this scenario, Carol, a 20-year-old friend of Alice's is also interested in (illegally) drinking.

Alice could be inclined to share her credentials with Carol (which would be problematic), and due to the zero-knowledge nature of the proofs, Bob has no way of telling if Carol is using credentials that are not her own. A possible solution to this is for the financial institution to only issue credentials containing the most intimate information it has about a user. If in order to lend her credential to Carol, Alice would have to share her account number, routing number and social security number, she is less likely to do so.

Another proposed herein in some embodiments, is for the financial institution computing systems to bind Alice's credentials to some biometric information, for example her face.

When issuing a credential to Alice, the financial institution computing system can obtain multiple photos of her face and trains a model (e.g., a data model representation) of her face. The model is a predicate (propositional function) taking in an image and deciding if it is a photo of Alice's face, in which case it returns, for example a value of "1" (affirmative/true). Otherwise, it returns a value of "0" (negative/false). This function is encoded as within the credential that is issued to Alice. At verification time, Bob sends a photo of the current customer (supposedly Alice). Alice is able to then proves in a "zero-knowledge" proof based approach that her credential contains an attribute such that without divulging the underlying information (specific age, or birth date).

Zero-knowledge proofs are described in various embodiments below adapted to solve a technical problem wherein a specific biometric or facial recognition problem where Alice, the prover, wants to protect the model of her face trained over multiple photos, but is willing to agree with Bob, the verifier, on a common photo of her face as in the store.

Effectively, Alice and Bob agree on some string x and a commitment $c_f$ to a function f. Alice knows the function f and Bob does not. Alice wants to prove in zero-knowledge proof (ZKP) to Bob that $f(x)=1$. The string x, for example, can be extracted from the common photo of her face as in the store. The string x in this example would then be a set of feature representations from the agreed upon photo that was taken temporally proximate to when she wants to validate.

In this example, for a private input x and public function f such that $f(x)=1$, Alice is able to prove in zero-knowledge proof (ZKP) that it is so. However, in some embodiments described herein, the roles are reversed: the function f is private and input x is public. Accordingly, this can be solved by considering instead the function $eval_x$, such that $eval_x(g) = g(x)$ for any function g. This reverses the roles of function and input so that a "garbled circuits"-based techniques can be used. At worst, evaluation can be done by evaluating a universal function u such that $u(x;f)=f(x)$, where f is a public input and x is a private one. But in special cases, the approach can do better. Special cases refer to situations where there is public information about the function f such as it being for example a convolutional neural network over a public topology. Then, the function u would be one that superimposes a set of weights on the network topology and evaluates it at x.

Note that if in some situations, requirements change in such a way that the approach requires that one would have to protect x as well, then the system can be configured to again use a universal evaluation function v such that $v(f, x)=f(x)$ for all f, x and prove in zero knowledge that $v(f, x)=1$, protecting both input values. In practical terms, f translates to a machine learning model recognizing a user's face whereas x refers to a photo of the user's face at the time of use. The designs proposed herein protect the information privacy of f. However, for practical reasons, in some embodiments, the approaches do not protect x. In other embodiments, approaches are also proposed that are adapted to protect x.

In operation, Alice can be issued a credential which can be stored, for example, on on-board memory on her device (or in an otherwise accessible location, such as Alice's cloud storage). Once the credential is issued, in some embodiments, there is no need for interactions with the trusted issuance authority for a verification. The issued credential can include data representations including some or all of the weights $<w_i>$ of her model, which, as noted below, in some embodiments, can be stored in partial models to reduce overall complexity. Alice can then present to Bob's device commitments $C'_{wi}$ to each weight $w_i$. Bob's device then evaluates the committed model $C_w$ on common input x (e.g., an image taken of Alice by Bob in real-time).

There are other commitment schemes that can be used. The example above uses Pedersen Commitments over Elliptic Curves. On the verifier side, a commitment looks like a public key; its data type is a single cryptographic group element.

On the prover side, the commitment is a tuple consisting of two cryptographic field elements, one representing the actual value being committed to and the other a privacy-preserving mask.

In some embodiments, f can be presented as weights of a binary neural network whose topology is public but where the weights are private, and bitwise functions can be utilized to transform every input bit into a bit function that operates on a corresponding weight, w. Alice's device utilizes a zero-knowledge proof protocol using the function f to prove to Bob's device that $f(x)=1$.

In some embodiments, zero-knowledge proof protocols are utilized to generate a hybrid data structure having at least a first portion representing a first partial feature or partial model portion set and a second portion representing a second partial feature or partial model portion set, each directed to different subsets of features from a full feature set. This approach reduces a computational burden of the computationally expensive zero-knowledge proof approaches. A user is on-boarded by providing a video stream or image of a biometric, such as a face, a retina, a body shape input, (e.g., in good capture conditions, such as good lighting conditions).

The hybrid data structure is what is stored after the on-boarding process of a new individual, and the full feature set is discarded and not stored. A face recognition machine learning model can be created specifically for this user and it will be trained using the provided video frames/streams and/or images. The initial user provided video or images are then discarded, once the training was successful.

The trained model can then be saved on an encrypted storage, or a part thereof can be stored. For example, the trained model can be represented in the hybrid data structure whereby there is a first portion and a second portion of the trained model, stored separately.

The first portion and the second portion can each represent a subset of the full feature set or nodes representing the trained model, and in some embodiments, they can be mutually exclusive with one another (while in other embodiments there could potentially be overlap).

In a variant embodiment, the full model is split in the first portion (e.g., a public) and the second portion (one or more private (ZKP) sub-models), and while the full model is stored on the secure storage and the prediction process only occurs with the second portion (e.g., private (ZKP) part). In another embodiment, only the second portion representing the one or more private (ZKP) sub-model is stored on the secure storage and prediction will happen using only the second portion.

The trained models can be compared across a population set of other biometrics (e.g., faces) to find certain values which vary widely across the trained models, and those can be selected for the second portion. For example, the second portion may include information whereby there can be enough data to obtain a level of uncertainty (e.g., at least 128 bits of uncertainty), such that even having the first portion, a malicious user is unable to recreate the underlying biometric.

The model sections or features selected for the second portion can be statistically defined in a first embodiment, and in a second embodiment, the model sections or features selected for the second portion can be dynamically defined as the reference population changes over time (e.g., as new biometrics are added, the reference can be the entire population or a sub-population, such as a randomly selected sub-population). A dynamically changing selection for the second portion can be useful in situations where the accuracy biometric is impacted by changes in overall trends (e.g., fashion trends where different accessories occlude different parts of faces).

The second portion has enhanced privacy preservation for a selected subset of features through the selective implementation of zero-knowledge proof protocols for transforming the second portion. The second portion can be stored on a special secure enclave. As the zero-knowledge proof protocols can be computationally expensive during generation and/or downstream processing, in some embodiments, it is important to select the subset of features which are highly relevant for the authentication process relative to other features.

The approaches described herein can be used for various biometric-based authentication where a full set of features are provided by an individual during an on-boarding process and transformed into a template data structure for future verification and/or validation. As noted herein, there is a risk associated with leakage of an unprotected template data structure, as it can potentially be utilized to reserve engineer the full set of features, which then be used for malicious entries and/or falsification of the individual's identity.

In an authentication flow, a user authentication request can be received, where the user provides a new biometric (e.g., image or video of their face). The user's biometric data for a challenge (e.g., video/image) is communicated to a biometric (e.g., face) recognition service or data process (e.g., an application or a daemon program) being operated on a computing device. The biometric recognition service loads the respective users' previously trained model from encrypted storage (e.g., by accessing the hybrid data structure or portions thereof).

Once the model was successfully loaded, it proceeds to the prediction step, to validate if the new biometric data (e.g., image or images) belong to the user or not. During the prediction step, a comparison engine is utilized where zero knowledge proof protocols are used for interaction with aspects of the model that, for example, have enhanced privacy and/or security features, such as the second portion of the hybrid data structure. The comparison engine may, in some embodiments, not be able to directly interact with the second portion (e.g., the values that were identified as having varied the most across a population of biometrics), and accordingly, as described herein, zero knowledge proofs can be utilized for indirect comparisons without access to the underlying information.

A prediction response message is returned to a device attempting to authenticate the end-user, which will indicate (e.g., qualify) if the new biometric image (e.g., face image) belongs the same user.

FIG. 1 is a computational system adapted for applying enhanced privacy mechanisms for biometric feature-based authentication, according to some embodiments.

The computational system 100 provides a technical solution to technical problems relating to privacy preservation, as well as establishing a technical trade-off in relation to maintaining satisfactory performance and reducing model leakage that can be utilized by malicious users. The computational system 100 is adapted for enhanced privacy during various points of the on-boarding, usage, and storage computational processes relating to biometric identification (for example, but not limited to, facial recognition). The computational system 100 is a computational system that can reside, for example, as a computer server implemented with physical computing components, such as computer processors, memory, and non-transitory computer readable storage mediums having various networked interfaces for data communications.

The system 100 includes a feature subset selection engine 102 that is adapted during a training phase to register features of a corpus of individuals (e.g., a few hundred or a few thousand individuals) to identify a subset of the universe of features or a universe of model portions having characteristics that are more pertinent to facial recognition than others. The corpus of individuals can be based on a training set of individuals or a reference set of individuals, or in some embodiments, based on a rolling set of features received from a latest set of on-boarding individuals. These feature characteristics can be identified, for example, through determining the subset of features or model portions which exhibit the largest amount of variation as between the corpus of individuals and/or are most useful in distinguishing between individuals.

In a variant embodiment, the varying characteristics are dynamically determined by the feature subset selection engine 102 on a periodic or triggered basis whereby the subset of features or model portions selected is modified over time. This is useful where, for example, the quality of images changes in a systematic way, such as where individuals start to provide feature sets where most individuals are now wearing masks, and the system can automatically adjust for these to ensure privacy enhancements shift focus from lips (e.g., no longer visible) to corners of eye features, among others.

For example, in the context of facial recognition tokens where images, depth map representations, and/or videos are processed from each of the individuals, backgrounds may not be of particular pertinence, but there may be aspects of the faces themselves represented in a specific subset of features or model portions that vary and are useful for facial recognition/identification/differentiation.

There can be different approaches for identifying this subset, for example, in a variation, feature subset selection engine 102 includes a neural network 104 that is adapted utilized to rank or categorize the features or model portions which provide the largest logit difference during classification training. The ranked features or model portions can then be utilized to extract an identified subset of features or model portions from the universe of available features or model portions. The neural network 104 can be configured to identify features or model portions and/or nodes representing features or model portions of interest by, for example, systematically or randomly de-activating nodes of various hidden layer representations during classification to test for differences in accuracy (e.g., as exhibited through logit differences).

The neural network 104 can be stored on secure enclave 106 or other extremely high security mechanisms given the sensitivity of the information stored and processed thereon. Secure enclave 106 can be adapted a very high level of protection, and, for example, can be adapted for highly secure communication pathways using strong encryption, and can include a secure enclave processor or other types of security-related instruction codes for access and/or execution segregation. The increased security of secure enclave 106 can require higher complexity or costs given the sensitive nature of information stored thereon. Where the reference individuals are either a dummy set of individual feature information or a publicly available training data set, there may be no need for a high level of security. Conversely, where the neural network 104 is being trained, for example, on a rolling basis of recent individual on-boarding full feature sets, an extremely high level of security is required. Secure enclave 106 can include a segregated memory area which has access restrictions whereby interactions are only permitted through a limited set of protocols or interfaces.

The system 100 includes a zero-knowledge encryption engine 107, which is adapted to apply a targeted cryptographic mechanism applied to only a part of the feature set when it is accessed whereby calculations are performed against the data stored thereon without exposing the data stored thereon. The zero-knowledge encryption engine 107, in some embodiments, resides instead on or can be accessed through the individual's portable computing device without access to the system 100. For example, the engine 107 may instead be a mobile app on the user's mobile application.

The targeted cryptographic mechanism utilized by zero-knowledge encryption engine 107 can be computationally expensive to generate and/or decrypt for future processing, and restricting the usage of the cryptographic mechanism to only part of the feature set reduces the overall computational burden. The targeted cryptographic mechanism, in some embodiments can be adapted to improve privacy of the feature representation, and in some embodiments, a "zero-knowledge proof" mechanism can be adapted for usage on the partial feature set stored on the secure enclave 106 by the zero-knowledge encryption engine 107.

The zero-knowledge proof mechanism, in some embodiments, is a computational encryption mechanism that utilizes mathematical approaches for a verification where both parties do not obtain access to the underlying values stored thereon. The second partial feature or partial model portion set is stored on enhanced security repositories such as secure enclave 106 such that it is difficult or computationally infeasible to reverse engineer the underlying full feature set without it. The enhanced security repositories can be adapted, for example, to restrict the types of possible interactions such that only certain interactions are possible that do not expose the underlying data stored therein. However, there is a computational performance cost with conducting this transformation, as well as increased cost of enhanced storage.

For example, a full feature set may be represented in a vector (e.g., a 128 bit data object). A subset of features or model portions for encryption, for example can include a subset of this vector (e.g., 32 bits of the data object) that are representative of a set of identified features or model portions for improved security. Those special 32 bits can be stored differently, for example, on a secure enclave data repository where they cannot be extracted or interacted with directly. When they are required for verification, a zero-knowledge proof mechanism can be applied to the 32 bits such that the 32 bits are used for verification without exposing their underlying values. The original feature set can now be safely discarded. Accordingly, even if a malicious user obtains the first partial feature or partial model portion set, there are aspects that are concealed, and even if exposed, the enhanced storage repository protects the bits stored thereon.

The second partial feature or partial model portion set identified for enhanced privacy-preserving encryption can be randomly selected or a pre-defined portion of the full feature set, or in some embodiments, can be identified using the feature subset selection engine 102 as an input into the computational mechanism when receiving or onboarding a new individual.

When the new individual's full feature set is received during the on-boarding, a face recognition machine learning model that is created specifically for this user can be trained using the provided video frames/streams and/or images. The initial user provided video or images are then discarded, once the training was successful.

The trained model can then be saved on an encrypted storage, or a part thereof can be stored. For example, the trained model can be represented in the hybrid data structure whereby there is a first portion and a second portion.

The computational system is configured to store, in a data repository 108, the first portion storing a first subset of features or a first portion of the model (e.g., if the model is a neural network, a partial representation of nodes, weights, and interconnections). In the secure enclave 106, a second portion storing a second subset of features where the second subset of features or a second portion of the model e.g., if the model is a neural network, a partial representation of nodes, weights, and interconnections) that has been adapted for use in accordance with an enhanced privacy-preserving encryption approach described herein. The hybrid feature set can be used as a privacy-preserved template data structure for future verifications. In some embodiments, future verifications are conducted solely with the second subset of features or a second portion of the model.

The full feature set can be discarded or simply not stored by the computational system for future usage (e.g., as a template), and instead, the hybrid feature set in the data structure can be stored for future usage. As privacy-preserving encryption has been applied to the hybrid feature set, it may be difficult or computationally impractical for a malicious user to be able to reverse engineer the full feature set from it, and thus the first partial feature or partial model portion set can be stored safely in the data repository 108.

In some embodiments, the entirety of the full model will be stored on the secure enclave 106 and the prediction only happens with the private (ZKP) part in the secure enclave 106. In another embodiment, the private (ZKP) sub-models are stored on the secure enclave 106 and prediction will happen using only this the second portion of the model. The data repository 108 storing the first partial feature or partial model portion set as a template for future usage can be of lower security (and thus less expensive) than that for storing the machine learning data model architecture of the first approach described herein or that storing the second partial feature or partial model portion set, and the usage of the privacy-preserving encryption is useful in reducing an overall risk and impact of a malicious user being able to use the information even if unauthorized access has occurred.

For example, data repository 108 can include on-board storage of an individual's personal mobile device or a computer, or on-board storage of a terminal used by a customer service representative in a teller booth at a financial institution. In another embodiment, data repository 108 can include on-board storage on a point of sale device for a merchant.

A on-boarding engine 110 can be provided that receives full feature sets from individuals for registration as templates for transformation by the zero-knowledge encryption engine 107. The full feature sets are received as data structures that can be, for example, videos, photos, depth map representations of faces, and these can be utilized to establish the hybrid data structures described herein. In some embodiments, a full biometric recognition machine learning model is created specifically for this user and it is be trained using the provided video frames/streams. For example, the full biometric recognition machine learning model can be a tailor-made machine learning model adapted specifically for the user and then trained, or it can be based on one or more baseline machine learning models that are then trained to modify weightings/filters, establish interconnections, among others, to then be customized specifically for the user.

Example model architectures that can be used as baselines include VGG-16, VGG-19, among others. A diversity of different model architectures can be stored in some embodiments, for example, as the underlying utility or various model architectures progress over time (e.g., some can be adapted for poor lighting conditions).

In a variant, the full feature sets from individuals for registration as templates are also communicated to the feature subset selection engine 102 in some variations for periodically or dynamically modifying the subset of features or model portions that are selected for the enhanced privacy-preserving protection. This can be useful, for example, in situations where a systematic shift in the quality of full feature sets or model portions and importance of various features or model portions thereof occurs. A practical example includes where individuals are starting to provide feature sets where they are wearing masks or religious face coverings, and the system can automatically adapt and focus the computationally expensive privacy enhancing aspects on other features or model portions that are most useful for distinguishing as between individuals (e.g., eyes instead of lips).

A verification engine 112 receives a new set of features from the individual at a later time during a biometric recognition challenge event (e.g., logging into online banking), and can send the features to a recognition service or data process. The verification engine 112 need not be directly on system 100, and in some embodiments, is instead provided on a verifier's device (e.g., Bob the bartender's mobile phone). The recognition service loads the respective users' previously trained model from encrypted storage, and once the model (or a secure portion thereof) was successfully loaded, it proceeds to the prediction step, to validate if the new image belongs to the user or not.

If there is a sufficiently high quality match (e.g., above a dynamically-defined threshold or a pre-defined threshold), an authentication response signal can be transmitted to a downstream computing device which can process the signal in effecting a downstream effect, such as approving access or denying access, or in some embodiments, requesting additional information or data sets through alternate verification (e.g., if a match score is in an indeterminate range).

Different variations are possible. In a first embodiments, the full model will be stored on the secure enclave 106 and the prediction by the verification engine 112 only happens with the private (ZKP) portion. In another embodiment, only the private (ZKP) sub-model is stored on the secure enclave 106 and prediction by the verification engine 112 will happen using only this portion of the model.

Figure 2:
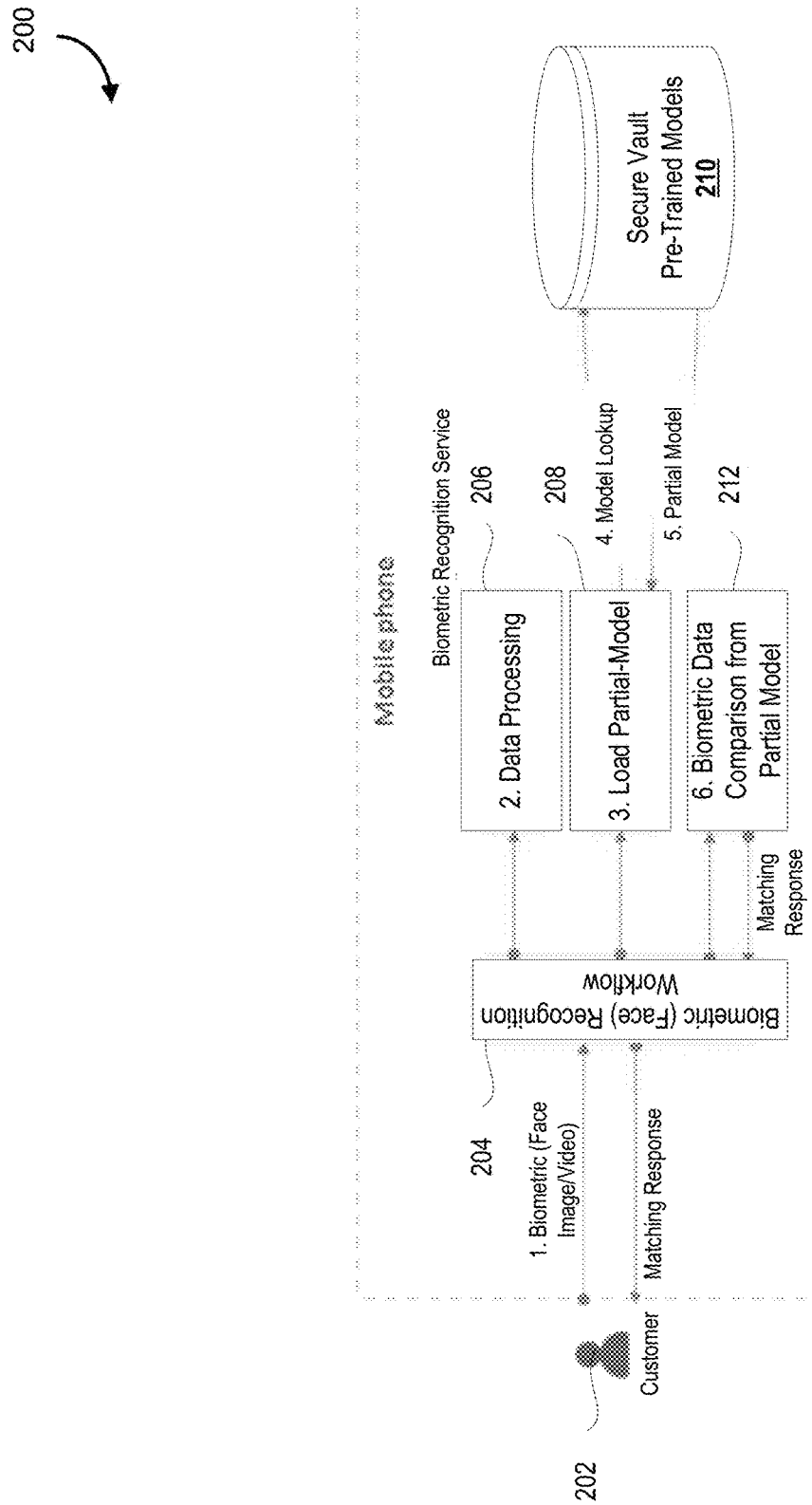
FIG. 2 is an example method diagram of a method for facial recognition, according to some embodiments.

FIG. 2 is an example method diagram of a method for facial recognition, according to some embodiments.

In FIG. 2, a customer 202 is an individual who is interacting with a face recognition service provided by system 100. Customer 202 provides the initial full feature set, for example, through a face image/video (which can also, in some embodiments, include other channels of information such as a depth map) where facial features can be extracted (e.g., stored as a full vector of information), which can then be utilized to establish a template storing partial data structures as described above. The feature subset selection engine 102, in some embodiments, has identified a subset of the features for enhanced privacy protection. The on-boarding engine 110 stores a template for future usage by verification engine 112. In some embodiments, the on-boarding engine 110 creates a new model to be trained using the features of the customer 202, the new model is instead stored as a local credential on the user's mobile device such that the local credential can be utilized without the trusted authority during verification.

When customer 202 is seeking to satisfy a challenge response established by the verification engine 112 using face recognition workflow 204, a new set of full features are provided or extracted, for example, through a new set of face images/videos/depth maps at data processing step 206. These are received and processed by a biometric recognition workflow (e.g., a face recognition workflow), and the verification engine 112 loads the partial models at 208 by retrieving the first partial feature or partial model portion set from a data repository, and interacts with the second partial feature or partial model portion set from the secure enclave 106 (e.g., secure vault). The model can be loaded entirely or in part using the respective users' previously trained model from secure enclave 106.

A data comparison against the new set of full features using the first partial feature or partial model portion set and a limited zero-knowledge proof protocol using the second partial feature or partial model portion set at 210 is used to generate a matching response signal based on a data comparison at 212, which can be a challenge response data structure or signal that is used for a downstream computing device to grant/provision or deny access to a protected resource.

Approaches are described below for utilizing model and/or model weights in proposed mechanisms for verification using, for example, a common input x in addition to commitment messages generated based on the model weights without Alice needing to expose the model directly to Bob.

FIGS. 3-6 are example flow diagrams showing an example approach to zero-knowledge proof-based facial recognition, wherein Alice, the prover, wants to protect the model of her face trained over multiple photos, but is willing to agree with Bob, the verifier, on a common photo of her face as in the store.

Alice and Bob agree on a string x and a commitment $c_f$ to a function f. Alice knows the function f and Bob does not. Alice wants to prove in zero-knowledge proof (ZKP) to Bob that $f(x)=1$.

Agreeing on the commitment to f is achieved by Alice (prover) presenting a privacy preserving (anonymous) credential in such a way that the attribute representing f is not revealed or hidden, but committed to. x is a photo of Alice's face in the moment (or in a time duration temporally proximate to) the protocol is being applied. f is a model that, upon being given input x', outputs 1 if x' is Alice's face and 0 otherwise. So the goal is to prove $f(x)=1$ without revealing f.

While it is already known that for a private input x and public function f such that $f(x)=1$, Alice can prove in zero-knowledge proof (ZKP) that it is so. However, here the roles are reversed: the function f is private and input x is public. In principle, this can be solved by considering instead the function $eval_x$, such that $eval_x(g)=g(x)$ for any function g. This reverses the roles of function and input so that the known garbled circuits techniques can be used. At worst, this can be done by evaluating a universal function u such that $u(x;f)=f(x)$, where f is a public input and x is a private one. But in special cases, the some of the approaches described herein can do better.

It is noted that if the requirements change in such a way that one would have to protect x as well, then the approach can be adapted to use a universal evaluation function v such that v(f, x)=f(x) for all f, x and prove in zero knowledge that v(f,x)=1, protecting both input values.

Figure 3:
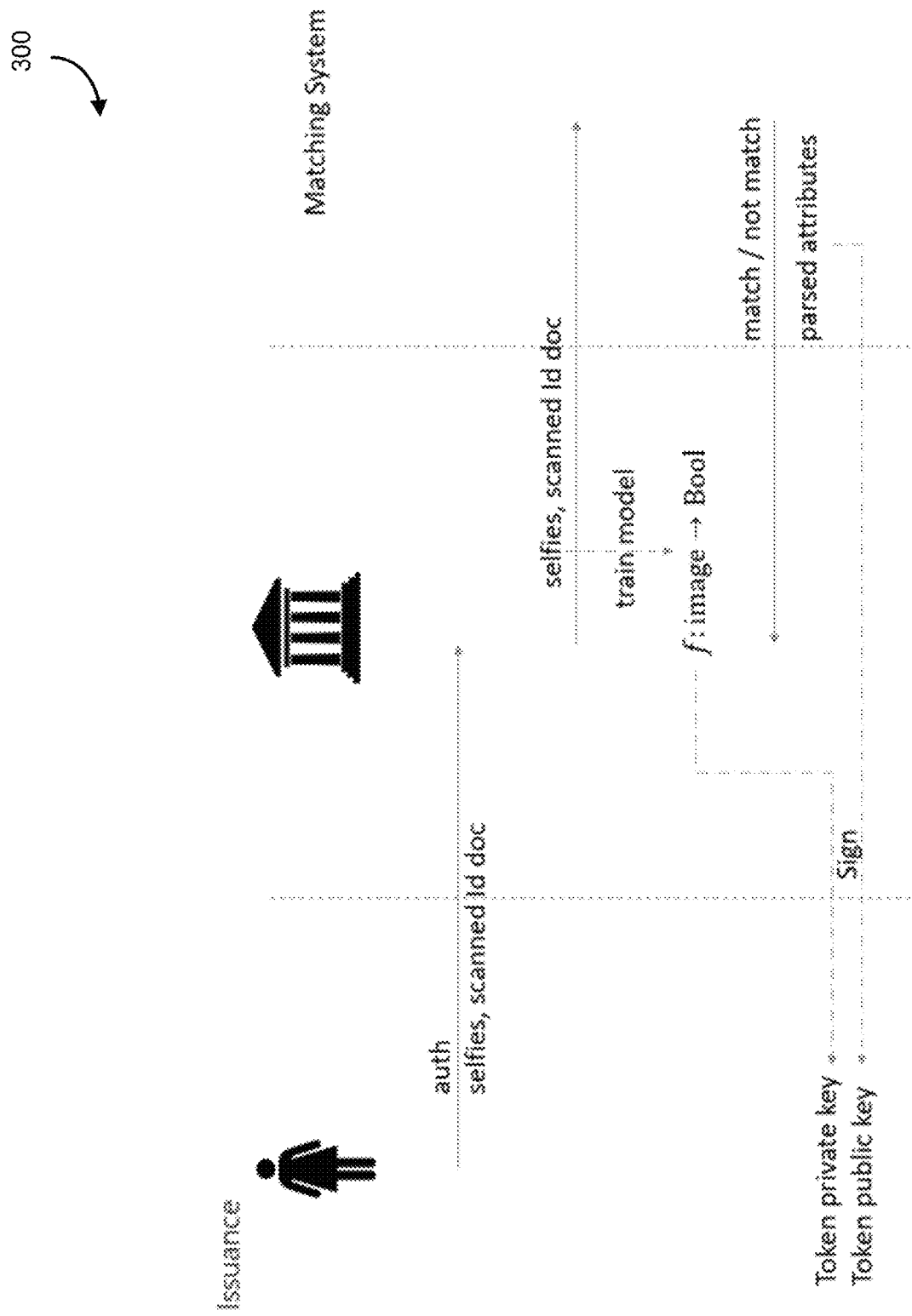
FIG. 3 is an example issuance computer implemented method, according to some embodiments.

FIG. 3 is an example issuance computer implemented method 300, according to some embodiments.

An individual initiates an authorization process where the individual takes a number of photos (e.g., selfie photos, photos of a reference scanned identity document) or other biometric data samples (e.g., fingerprint extractions) on the individual's mobile device, and provides this data set to the financial institution computing system. The financial institution computing system receives the data samples and uses the data to train a model that is maintained to map a verification function that, for example, returns a true (1) or false (0) depending on whether a match is predicted. Training can include using a known topology of a machine learning model whose weights are refined and kept private as part of the training process. In such an example, the model topology may be known, but the individual weights are not.

In some embodiments, the reference scanned identity document is more heavily weighted than the other received biometrics for the purposes of training the model. In other embodiments, it is used as the ground truth. The model may, for example, represent a transfer function whose constants or parameters are represented by data values that have been tuned during an iterative training process (f: image→Bool). The trained model, for example, is a model of the individual's face.

The model is a represented as a predicate (propositional function) taking in an image and deciding if it is a photo of individual's face, in which case it returns 1. Otherwise, it returns 0. This function can be encoded within the credential package that the financial institution computing system issues to the individual's device (e.g., stored on local data storage or accessible via cloud storage).

A matching system can be used to test the received data samples to ensure and validate that the model is operable for its intended purpose—a subset or all of the data samples can be processed through the trained model to validate that the model returns the correct Boolean value (e.g., TRUE). The model representation, in some embodiments, can be represented as a set of feature parameters which can be used together to recreate the transfer function f. The representation of the transfer function can then be tokenized, and utilized to establish a token private/public key pair that can, for example, be signed by the financial institution computing systems.

As described earlier, the credential may be stored as partial models in different secure storages and combined together during verification for additional security.

Figure 4:
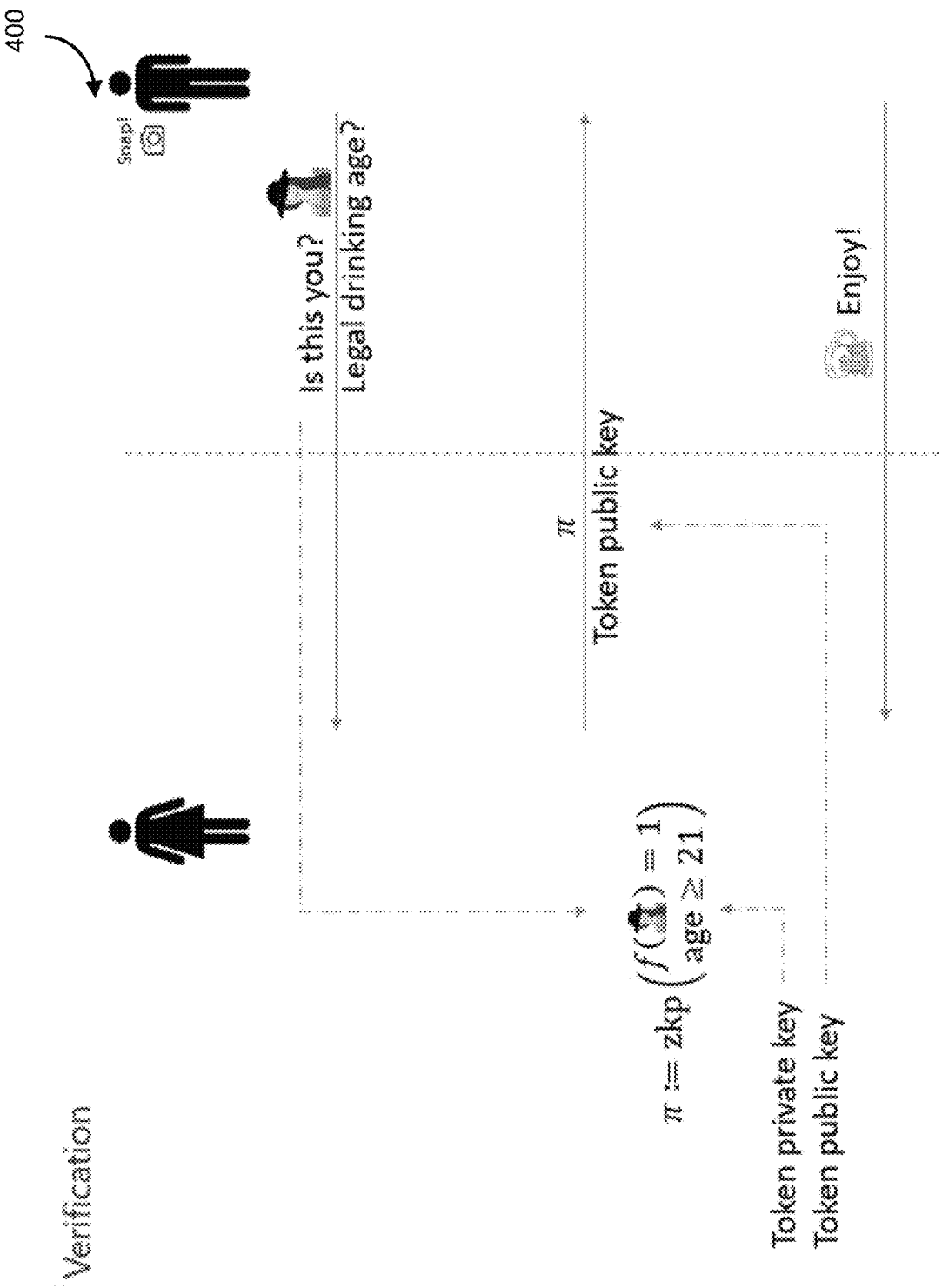
FIG. 4 is an example verification computer implemented method, according to some embodiments.
Figure 6:
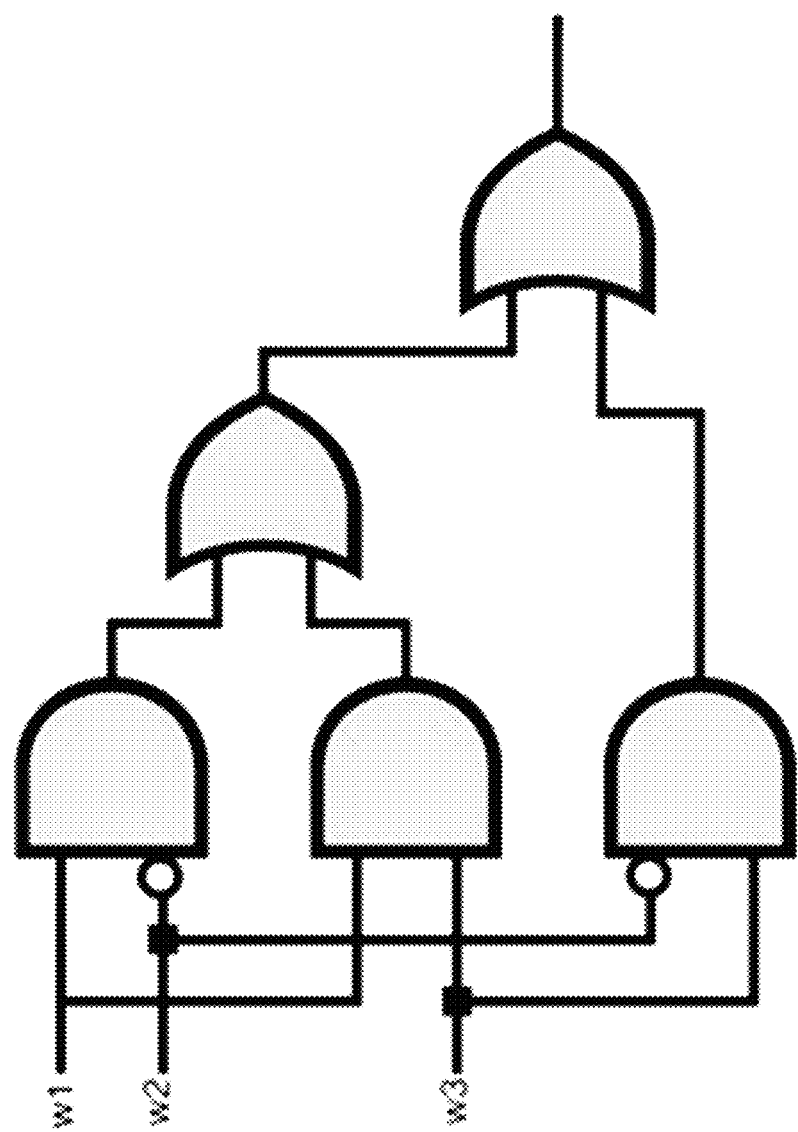
FIG. 6 is a diagram illustrating an example circuit for a calculation, according to some embodiments.

FIG. 4 is an example verification computer implemented method 400, according to some embodiments. The method 400 can be invoked at a point in time that is after the issuance flow (e.g., after the tokens have been established). In this example, the individual would like to be verified to access a restricted service or product (e.g., alcohol). In this example, the verifying service (e.g., a mobile application on a bartender's mobile device) can be utilized to capture a picture of the individual. The picture of the individual can then be processed to extract a set of features that are provided to a verification service to determine that the individual, in this example, is above the age required to purchase an alcoholic beverage. There is no online communication with the financial institution by either Alice or Bob during the interaction between Alice and Bob. The photo (or a representation thereof) is sent by Bob to Alice's device.

At verification time, in this example, the bartender, Bob sends a photo of the current customer (supposedly Alice, the individual) to them. Alice is able to process the photo or features thereof using the credential to prove in zero knowledge that her credential contains an attribute (>21 years old) such that without divulging the underlying value, such as Alice's birthdate or actual age. In FIG. 4, token private and public key are shown as parts of underlying Anonymous Credentials approaches. An example of these can be provided using, for example, the U-Prove approach, where the joint purpose of the public and private tokens is for Alice to be able to convince Bob of certain identity claims about her attested to by the trusted party, in this case, a bank.

FIG. 5 is an example expanded verification computer implemented method 500, according to some embodiments, showing example technical steps that can be used to support the method flow of FIG. 4. The diagram illustrates a set of communications in accordance with a methodology for message flow for verification. There can be 2 or 3 message examples, depending on the construction used.

The nature of the messages also depends on the construction used but it can be somewhat described as:
Receiver←Sender (setup message)
Receiver→Sender (masked choice)
Receiver←Sender (encryption of both messages, in such a way that only one can be decrypted)
Two-message constructions manage to skip the first step.

In this example, a number of messages are communicated between the devices. Two parties are shown, Alice and Bob. Each of Alice and Bob have corresponding portable computing devices (e.g., smartphones) having corresponding mobile applications installed thereon which allow Alice and Bob to conduct a verification flow based on a credential that has already been issued (and potentially signed) by a trusted party, in this example, a bank, during an onboarding process.

Alice's credential contains the weights $<w_i>$ of her model. She presents to Bob commitments $C'_{wi}$ to each weight $w_i$ as per the U-Prove protocol (other embodiments may use other protocols). For U-prove tokens, these, however are algebraic commitments and in order to be usable for Garbled Circuits they must be converted to non-algebraic commitments $C_{wi}$. Bob can take a photo of Alice using his device, which is then a photo of Alice's face (input x). An oblivious transfer message (OT1) can be sent to Alice, and a number of messages can be communicated back and forth whereby Alice's computing device can receive the input x, commit to the model Cw.

To evaluate the committed model $C_w$ on common input x, Bob constructs a circuit that takes w as input and evaluates w's model on x. Bob's device may, for example, send back a message with a garbled circuit (GC) that has weights w' as input, and evaluates to 1 if and only if w'(x)=1, and this can be sent back via an oblivious transfer 3 (OT3) message.

"Sending over the Garbled Circuit" includes sending cryptographically protected information about each gate through which Alice's device can obtain a corresponding garbled output for the set of garbled input she has to the gate. At the end of the OT protocol Alice has the garbled values of her input to the circuit and is able to use the outputs to provide to Bob so that she can show Bob that she is indeed of age without having to reveal the underlying model.

As described above, in accordance with the methodology of Chase, Ganesh and Mohassel, they will perform one of the following to ensure that Alice is using the values committed to by her Anonymous Credential as input to the Garbled Circuit:

Alice will either break up her input vector into bits, commit to each individual bit, and prove in zero knowledge that it is a correct bit decomposition of her input vector. After the Oblivious Transfer subprotocol, Alice sends commitments to each input key $K_i$ to Bob. After in accordance with the methodology of Jawurek et al, Bob reveals the randomness he used in the Oblivious Transfer subprotocol, Alice proves in zero knowledge for each bit $w_i$ of her input that $K_i = x(K_i^1 - K_i^0) + K_i^0$.

Bob will randomize values a,b and adds a garbled subcircuit that computes t:=af+b. After evaluating the circuit, Alice sends a commitment to the value t to Bob. When opening the circuit, Bob also reveals his auxiliary input a, b whereupon Alice proves in zero knowledge that the relation t=af+b holds.

Consider the input x=[+1, −1, +1] and a simple xnor-popcount operation. Then the circuit will be the circuit shown in FIG. 6, resembling a majority-gate 600, for example. It is noted that in this trivial example it would actually be more efficient to directly make one garbled gate with 8 different input configurations, and that the parts of the circuit corresponding to the next layers will be twice as complex because the weights are applied to the output of this layer as opposed to values known to Bob, but the principle is the same.

Bob also needs to know that the inputs $w_i$ that Alice is feeding to the garbled circuit are the same ones as in her commitment $C_{wi}$. For that end, Bob also constructs circuits that upon taking weight $w_i$ and mask $r_i$ determine if they correspond with the commitment $C_{wi}$. For example if the commitment scheme uses a hash function, the circuit would simply compute $H(w_i \| r_i)$ and Bob would check if the value is equal to $C_{wi}$.

In a scenario where f evaluates a binary neural network (BNN) whose topology is public, but whose weights w are private to Alice, all that needs to be done is to transform every input bit $x_i$ into a bit function that operates on its corresponding weight $w_i$. If the function combining $x_i$ and $w_i$ is an XNor for example, if $x_i=0$ then the combination would be NOT $w_i$ and if $x_i=1$ it would be $w_i$, in which case no gate is necessary.

In respect of binary neural network evaluation, the approach is modified in that here w rather than x is the input.

A further optimization may be provided in an variant embodiment: Rather than actually creating not gates for $x_i$, its action may be pushed forward into the transfer function.

As an example, take $x_0=0$, $x_1=1$ and the transfer function being addition (or rather counting ones). Let $y_0$, $y_1$ be the least and most significant bits of the transfer function's output, respectively. Then, rather than computing them as $x_2$:=NOT $x_0$, $y_0$:=$x_2$+$x_1$, $y_1$:=$x_2$ OR $x_1$, we can compute $y_0$:=$x_1$+(NOT $x_0$), $y_1$:=(NOT $x_0$) OR $x_1$. This removes the not gate computing $x_2$, and in the original Yao scheme, this does not increase the complexity of those computing $y_0$, $y_1$. However, this might not be the case in other GC constructions. For instance, there are approaches where computing XORs comes at no cost, for which this "optimization" would result in a penalty on the computation of $y_0$, but possibly still improving $y_1$'s.

FIGS. 7-10 illustrate an example approach for testing the applicability of binary neural networks for validating the usability of the designs. In particular, an approach is shown using an analogous data set for a simple application relating to MNIST digit identification. The models can be adapted and extended for facial identification. A BNN can be initially designed along with a garbled circuit that can identify simple images. The BNN can then be improved to identify faces, along with a final garbled circuit based face identifier.

A four phase approach can be identified: Phase 1: a trained BNN model that identifies MNIST digits. Phase 2: an end-to-end pipeline that uses a trained BNN converts it to Garbled Circuit and identifies MNIST digits. Phase 3: a trained (modified)BNN that identifies LFW/VGGNet2 faces. Phase 4: use the pipeline designed in phase 2 to create the final ZKP face detector.

Face images can be prepared and processed to extract faces, for example, from a data set such as FaceNet. Different losses can be utilized, such as classification losses or triplet losses, and in some embodiments, triplet losses are utilized.

At Phase 1, a simple naive BNN with MNIST can be provided, for example, training a classifier to get a pre-trained model. Then the loss can be changed by replacing classification loss with triplet loss, similar to FaceNet and the BNN could be trained to learn digit embeddings (using the pre-trained network). Fine-tuning the classifier with triplet loss can be used to create a digit/face embedding model.

The phase can include (Option 1) training n binary classifiers with a fixed embedding model (n is the number of users) to detect each digit/face from others (others=public data), and/or (Option 2) training n one class classifier(s) to identify each digit/face.

In Option 1, the training can be done with shared digit/face embedding models. To train these model one can use user images vs public images. In Option 2, the advantage of this option is that one only needs the user images.

Figure 7:
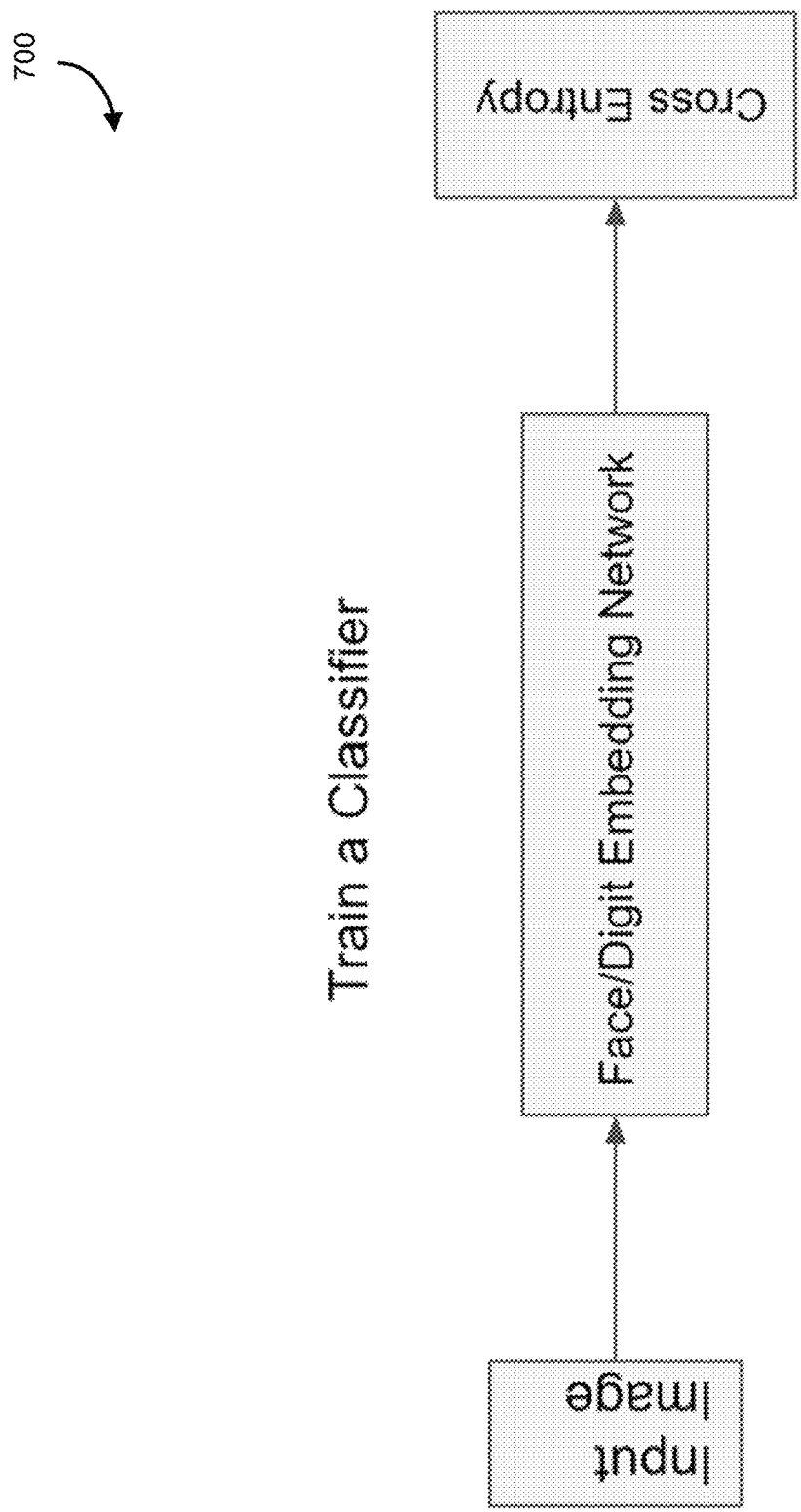
FIG. 7 is an example schematic diagram illustrating an approach for training a classifier, according to some embodiments.

FIG. 7 is an example schematic diagram 700 illustrating an approach for training a classifier, according to some embodiments.

Figure 8:
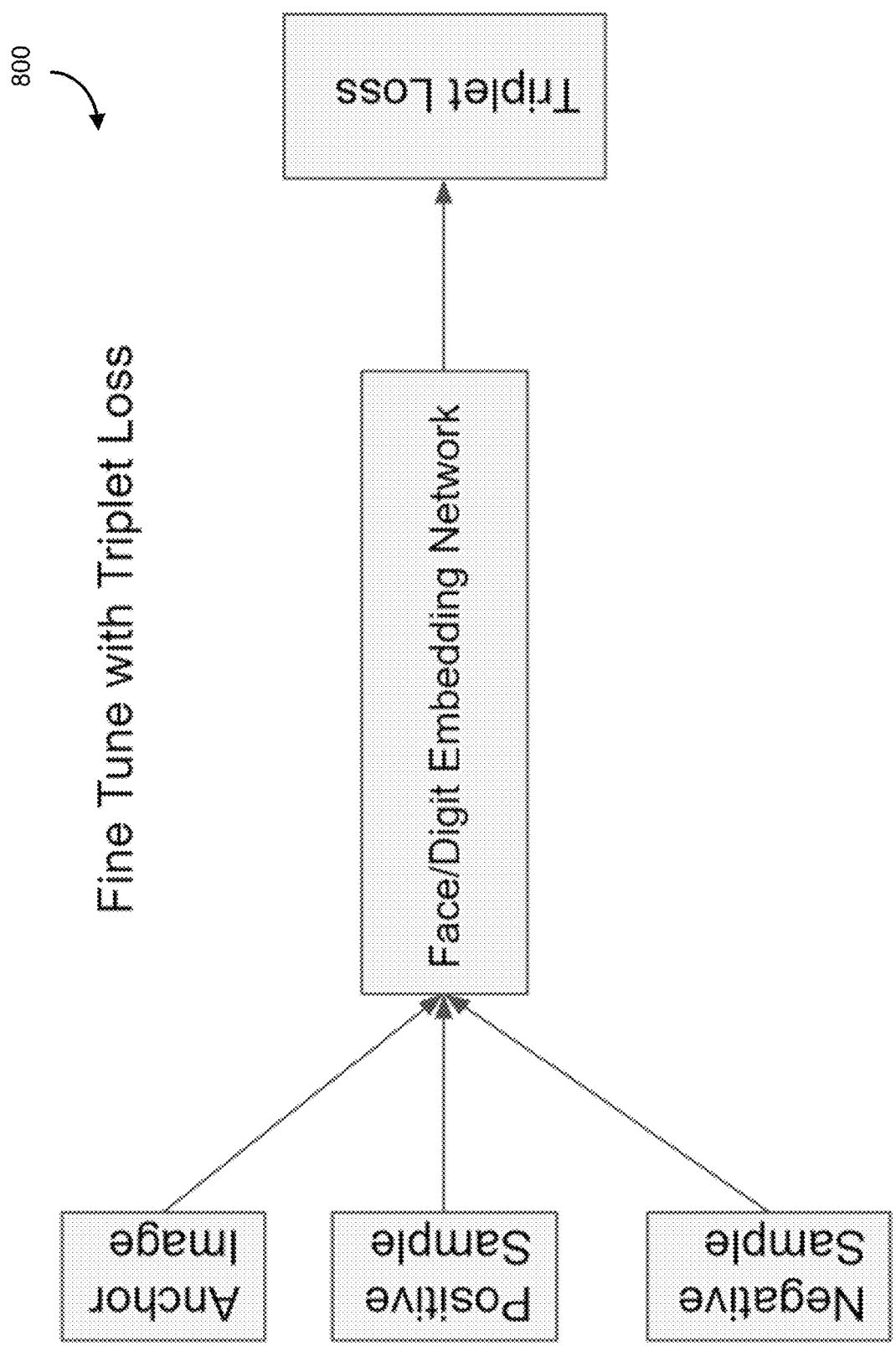
FIG. 8 is an example schematic diagram illustrating an approach for fine tuning the model with triplet loss, according to some embodiments.

FIG. 8 is an example schematic diagram 800 illustrating an approach for fine tuning the model with triplet loss, according to some embodiments.

Figure 9:
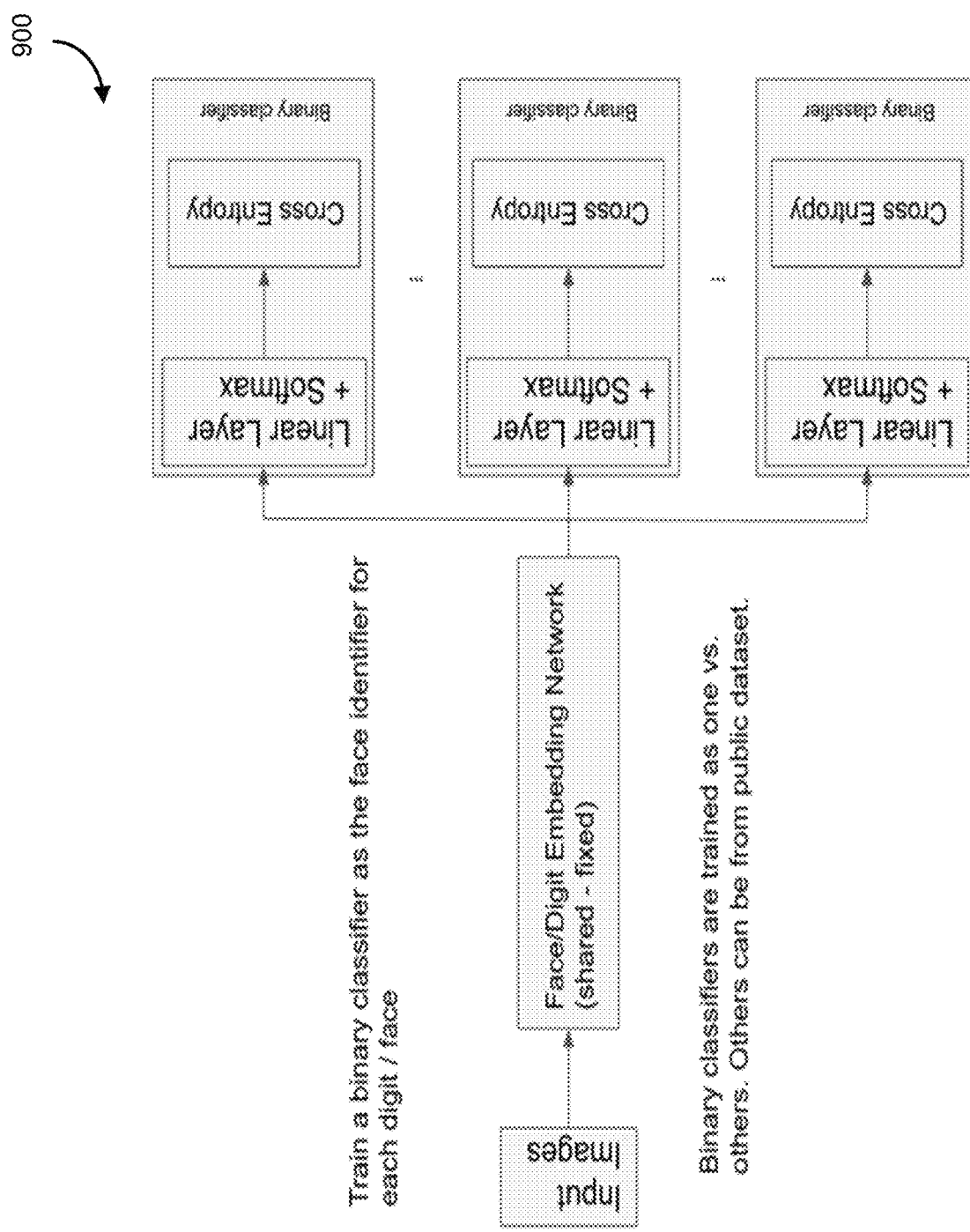
FIG. 9 is an example schematic diagram illustrating an approach for training a binary classifier as the face identifier for each face/digit, according to some embodiments.

FIG. 9 is an example schematic diagram 900 illustrating an approach for training a binary classifier as the face identifier for each face/digit, according to some embodiments.

Figure 10:
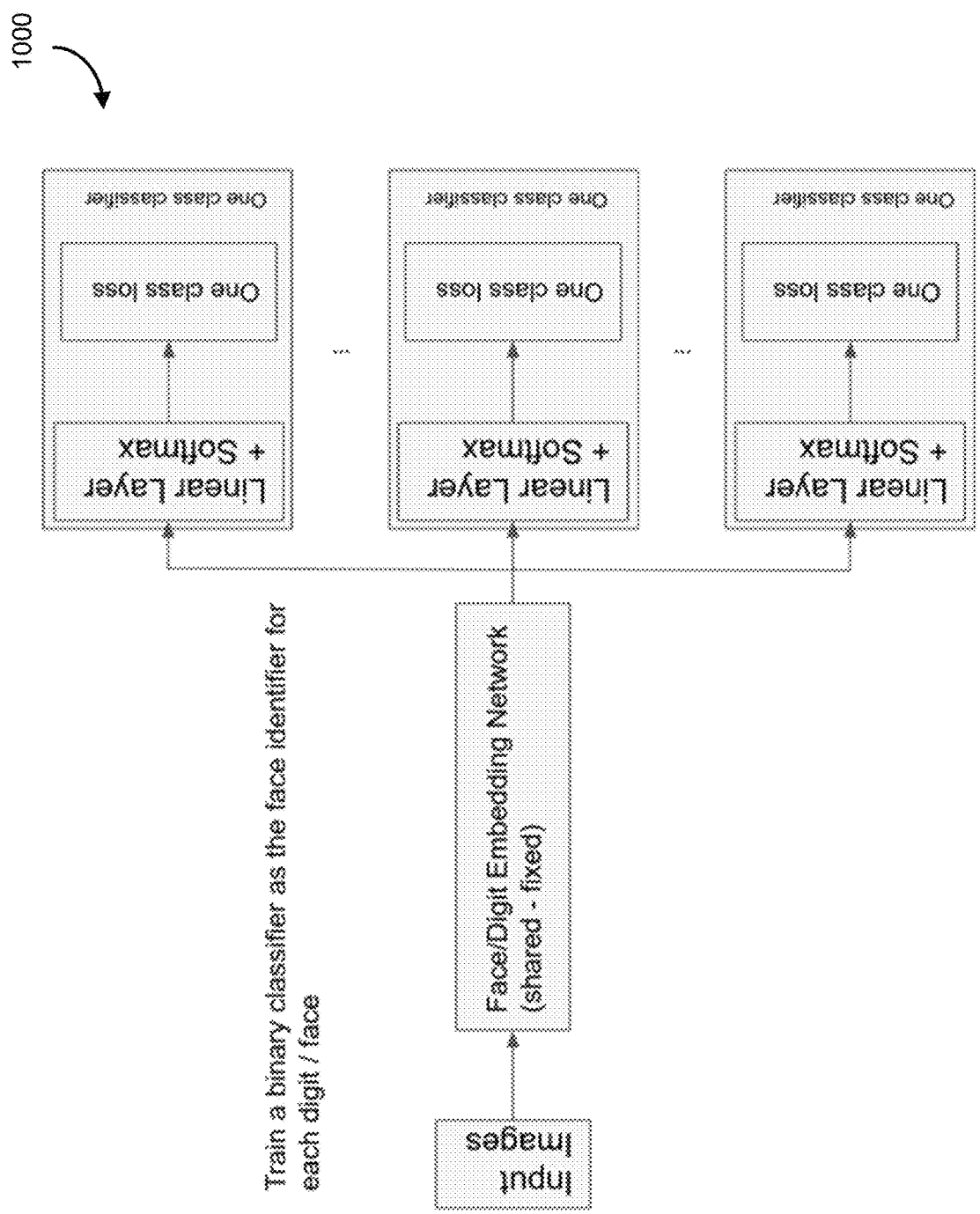
FIG. 10 is an example schematic diagram illustrating an approach for training a binary classifier as the face identifier for each face/digit, according to some embodiments.

FIG. 10 is an example schematic diagram 1000 illustrating an approach for training a binary classifier as the face identifier for each face/digit, according to some embodiments. In FIG. 9, instead of cross-entropies as shown in FIG. 8, one class loss is utilized instead.

At Phase 2, if good accuracy is obtained, a garbled circuit to detect digits can then be designed.

At Phase 3, the BNN can be provided the face images. There may be challenges in obtaining acceptable performance, and approaches to improve performance can include Teacher-student/distillation techniques [Distilled Binary Neural Network for Monaural Speech Separation], or adding distribution aware losses to the triplet loss.

At Phase 4, the model is converted into a garbled circuit.

Figure 11:
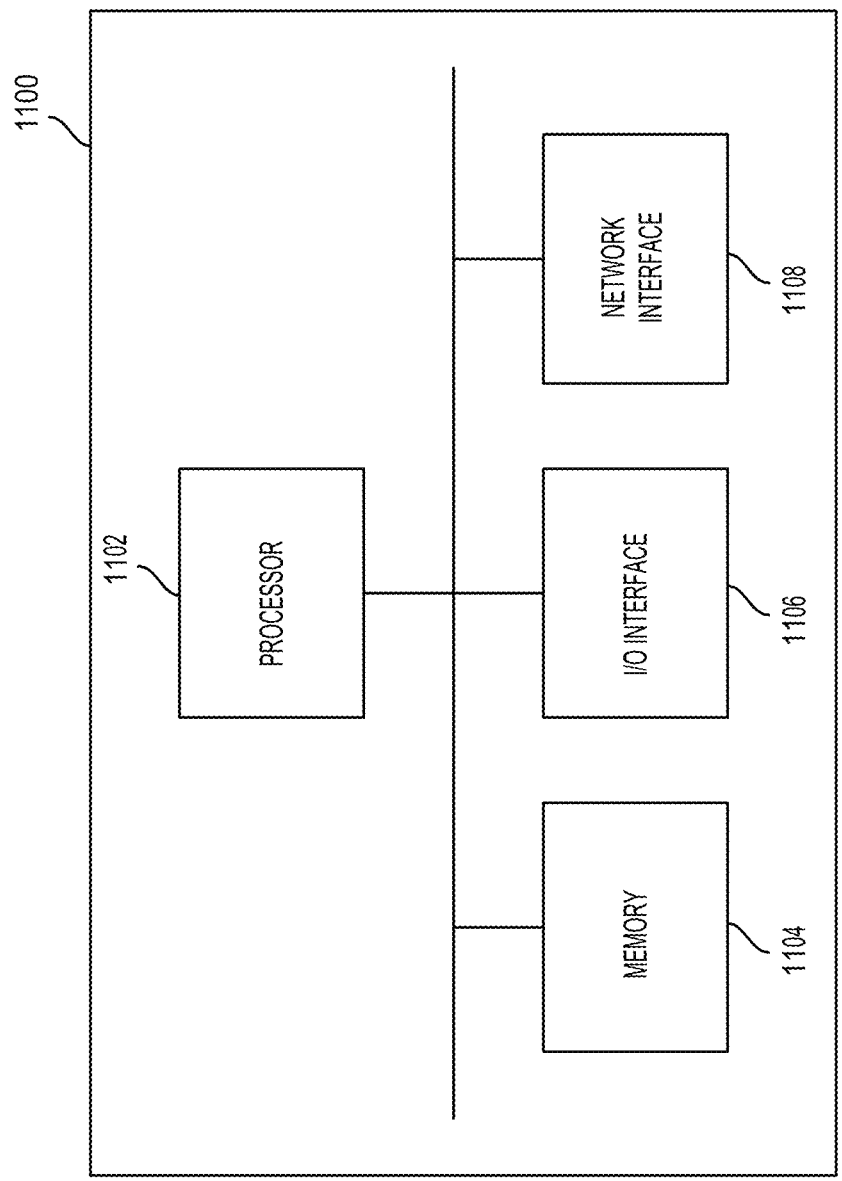
FIG. 11 is an example computing device for implementing the system of various embodiments.

FIG. 11 is an example computing device for implementing the system of various embodiments. The system 1100 can be provided in the form of a physical computer server that resides within a data center having interconnections with upstream and/or downstream computing devices. For example, in the context of a financial institution, the system can be utilized as a gatekeeper authentication mechanism for various types of sensitive interactions requiring validation, such as usage of a mobile application related to online banking, registration at a bank teller counter, among others. System 1100 can include various computer processors 1102 (e.g., micro-processors, reduced instruction set processors), computer memory 1104 (e.g., RAM, ROM, integrated memory), input/output interfaces 1106 (e.g., keyboards, mice, touch interfaces), and network interfaces 1108 (e.g., network modems/data connections for communicating data packets).

System 1100 can be coupled to other systems, such as upstream and downstream systems, and for example, upstream systems can request, through an application programming interface (API) call through network interfaces 1108, a request for facial recognition on-boarding and/or subsequent matching, and a computation process can be invoked to conduct this process, whereby a facial recognition token is generated in the on-boarding process for future usage as a template for verification.

When the privacy-preserving hybrid data structure is generated and stored as a template, it can be stored and propagated across multiple data repositories for usage in verification, such as being loaded on on-board memory of the individual's personal device, on an on-board memory of a bank teller authentication terminal. Instead of, or in addition to requesting other authentication, such as providing a client card and a PIN, the facial recognition mechanism can then authenticate against the privacy-preserving token. A secure enclave mechanism can be utilized for loading the second partial feature or partial model portion set representation.

In an example use case, the biometric verification system allows the individual to conduct banking operations to, for example, facilitate touchless operations with a bank. The individual (e.g., a customer) goes to the financial institution, and instead of approaches where physical verification is required using a client card, the individual doesn't need to go into close contact with the employee (e.g., customer service representative).

The individual, for example, can use his/her mobile device or a specifically established computing station to validate his/her identity without interactions with the customer service representative. As only the first partial feature or partial model portion set is stored, for example, on an accessible repository, even if the first partial feature or partial model portion set is exposed (e.g., by a malicious user using a man in the middle attack), the first partial feature or partial model portion set is not useful for reverse engineering the full feature set as it is incomplete.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for enhancing biometric template security, the system comprising:
   a computer memory operating in conjunction with non-transitory computer readable data storage media housing at least a first data repository and a second data repository;
   one or more computer processors configured to:
      receive a data object representative of a full biometric feature set;
      store a subset of the full biometric feature set or representations of a model trained from the full biometric feature set as a first partial feature or partial model portion set data object in the first data repository;
      store a remaining subset of the full biometric feature set or representations of the model trained from the full biometric feature set in the second data repository, said remaining subset of said full biometric feature set or representations of said model trained from said full biometric feature set being accessible from said second data repository only via one or more zero-knowledge proof protocol interfaces; and
      discard the data object representative of the full biometric feature set;
   wherein the remaining subset selected for storage in the second data repository includes a plurality of feature or model representations exhibiting a largest variance in a training data set, wherein the plurality of feature representations exhibiting the largest variance are identified using one or more neural networks, each of said one or more neural networks having one or more controllable layers that are systematically deactivated to identify changes in classification accuracy, the systematic deactivation of the layers utilized to identify the features having the largest variance;
   wherein both the first partial feature or partial model portion set data object and the remaining subset of the full biometric feature set or representations of the model are used during an authentication challenge to generate a matching response signal based on a data comparison against a new set of full features using (i) the first partial feature or partial model portion set data object and (ii) against the subset selected for storage in the second data repository interacted only through using the one or more zero-knowledge proof protocol interfaces.

2. The system of claim 1, wherein the first partial feature or partial model portion set data object is utilized in combination with the remaining subset of the full biometric feature set or representations of the model to complete the model during a verification using the completed model.

3. The system of claim 1, wherein the subset selected for storage is dynamically determined on a periodic or triggered basis.

4. The system of claim 3, wherein the dynamic determination is triggered when the quality of images changes in a systematic way.

5. The system of claim 1, wherein the one or more computer processors are configured to:

receive a new full biometric feature set provided from an individual in response to the authentication challenge;

access the first data repository to retrieve the first partial feature or partial model portion set data object to generate a first comparison value against a corresponding first portion of the new full biometric feature set;

interact with the second data repository to load a model based on the model trained from the full biometric feature set utilize the one or more zero-knowledge proof protocol interfaces to generate a second comparison value against a corresponding second portion of the new full biometric feature set; and based on the first comparison and the second comparison value, generate a challenge response signal to control access to one or more controlled resources.

6. The system of claim 5, wherein the model based on the model trained from the full biometric feature set is only based on the partial portion of the full model stored on the second data repository.

7. The system of claim 5, wherein the one or more controlled resources is an automated teller machine interface, or the one or more controlled resources is a graphical user interface associated with a customer services representative terminal, or the one or more controlled resources is a graphical user interface associated with a merchant payment terminal.

8. The system of claim 5, wherein the representations of the model are encapsulated as a credential data object containing weights of the model.

9. The system of claim 8, wherein the weights of the model are utilized to generate a set of commitment data objects that are provided to a verifying computing system coupled to the one or more controlled resources, the set of commitment data objects, including committed to data including obfuscated weights, used to evaluate a correctness of an authentication that was determined using the original model with non-obfuscated weight data using the new full biometric feature set by obtaining a corresponding output with an obstructed/garbled model also using the new full biometric feature set.

10. A method for enhancing biometric template security, the method comprising:

providing at least a first data repository and a second data repository;

receiving a data object representative of a full biometric feature set;

storing a subset of the full biometric feature set or representations of a model trained from the full biometric feature set as a first partial feature or partial model portion set data object in the first data repository;

storing a remaining subset of the full biometric feature set or representations of a model trained from the full biometric feature set in the second data repository, said remaining subset of said full biometric feature set or representations of said model trained from said full biometric feature set being accessible from said second data repository only via one or more zero-knowledge proof protocol interfaces; and discarding the data object representative of the full biometric feature set;

wherein the remaining subset selected for storage in the second data repository includes a plurality of feature or model representations exhibiting a largest variance in a training data set, wherein the plurality of feature representations exhibiting the largest variance are identified using one or more neural networks, each of said one or more neural networks having one or more controllable layers that are systematically deactivated to identify changes in classification accuracy, the systematic deactivation of the layers utilized to identify the feature having the largest variance;

wherein both the first partial feature or partial model portion set data object and the remaining subset of the full biometric feature set or representations of the model are used during an authentication challenge to generate a matching response signal based on a data comparison against a new set of full features using (i) the first partial feature or partial model portion set data object and (ii) against the subset selected for storage in the second data repository interacted only through using the one or more zero-knowledge proof protocol interfaces.

11. The method of claim 10, wherein the first partial feature or partial model portion set data object is utilized in combination with the remaining subset of the full biometric feature set or representations of the model to complete the model during a verification using the completed model.

12. The method of claim 10, wherein the subset is dynamically determined on a periodic or triggered basis.

13. The method of claim 12, wherein dynamic determination is triggered when the quality of images changes in a systematic way.

14. The method of claim 10, wherein the one or more computer processors are configured to:

receive a new full biometric feature set provided from an individual in response to the authentication challenge;

access the first data repository to retrieve the first partial feature or partial model portion set data object to generate a first comparison value against a corresponding first portion of the new full biometric feature set;

interact with the second data repository to utilize the one or more zero-knowledge proof protocol interfaces to generate a second comparison value against a corresponding second portion of the new full biometric feature set; and based on the first comparison and the second comparison value, generate a challenge response signal to control access to one or more controlled resources.

15. The method of claim 14, wherein the model based on the model trained from the full biometric feature set is only based on the partial portion of the full model stored on the second data repository.

16. The method of claim 14, wherein the representations of the model are encapsulated as a credential data object containing weights of the model.

17. The method of claim 16, wherein the weights of the model are utilized to generate a set of commitment data objects that are provided to a verifying computing system coupled to the one or more controlled resources, the set of commitment data objects, including committed to data including obfuscated weights, used to evaluate a correctness of an authentication that was determined using the original model with non-obfuscated weight data using the new full biometric feature set by obtaining a corresponding output with an obstructed/garbled model also using the new full biometric feature set.

18. A non-transitory computer readable medium storing machine interpretable instructions, which when executed by a processor, cause the processor to perform a method for enhancing biometric template security, the method comprising:

providing at least a first data repository and a second data repository;

receiving a data object representative of a full biometric feature set;

storing a subset of the full biometric feature set or representations of a model trained from the full biometric feature sets a first partial feature or partial model portion set data object in the first data repository;

storing a remaining subset of the full biometric feature set or representations of the model trained from the full biometric feature set in the second data repository, said remaining subset of said full biometric feature set or representations of said model trained from said full biometric feature set being accessible from said second data repository only via one or more zero-knowledge proof protocol interfaces; and discarding the data object representative of the full biometric feature set;

wherein the remaining subset selected for storage in the second data repository includes a plurality of feature or model representations exhibiting a largest variance in a training data set, wherein the plurality of feature representations exhibiting the largest variance are identified using one or more neural networks, each of said one or more neural networks having one or more controllable layers that are systematically deactivated to identify changes in classification accuracy, the systematic deactivation of the layers utilized to identify the features having the largest variance;

wherein both the first partial feature or partial model portion set data object and the remaining subset of the full biometric feature set or representations of the model are used during an authentication challenge to generate a matching response signal based on a data comparison against a new set of full features using (i) the first partial feature or partial model portion set data object and (ii) against the subset selected for storage in the second data repository interacted only through using the one or more zero-knowledge proof protocol interfaces.

* * * * *